United States Patent
Manico et al.

(10) Patent No.: US 7,295,244 B2
(45) Date of Patent: Nov. 13, 2007

(54) SYSTEM FOR CAPTURING AND ARCHIVING MOTION VIDEO SEGMENTS

(75) Inventors: Joseph A. Manico, Rochester, NY (US); John R. Fredlund, Rochester, NY (US); Kenneth Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 996 days.

(21) Appl. No.: 10/287,728

(22) Filed: Nov. 4, 2002

(65) Prior Publication Data

US 2003/0184674 A1 Oct. 2, 2003

Related U.S. Application Data

(60) Provisional application No. 60/367,561, filed on Mar. 26, 2002.

(51) Int. Cl.
*H04N 5/225* (2006.01)
*H04M 1/00* (2006.01)

(52) U.S. Cl. ............... 348/373; 348/207.1; 455/556.1

(58) Field of Classification Search ............ 348/207.1, 348/207.2, 231.2, 333.05, 333.01, 333.02, 348/373, 374, 375; 396/300, 374, 429; 455/556.1, 556.2
See application file for complete search history.

(56) References Cited

U.S. PATENT DOCUMENTS 5,164,831 A 11/1992 Kuchta et al.
6,147,703 A 11/2000 Miller et al.
6,233,015 B1 5/2001 Miller et al.

(Continued)

FOREIGN PATENT DOCUMENTS

EP 0841665 5/1998

(Continued)

OTHER PUBLICATIONS

Compact Flash Specification—V1.4, Published by Compact Flash Association, Palo Alto, CA 1998-1999.

(Continued)

*Primary Examiner*—John M. Villecco
(74) *Attorney, Agent, or Firm*—Susan L. Parulski; Frank Pincelli; Eugene I. Shkurko (57) ABSTRACT

A system for automatically transferring a plurality of digital video segments stored by a digital camera onto a separate storage medium. The system includes the digital camera and a docking unit. The digital camera includes a lens for providing an optical image; an image sensor for receiving the optical image provided by the lens to produce an image signal; a processor responsive to the image signal for producing the plurality of digital video segments; a digital memory for storing the plurality of digital video segments; a color image display for reviewing the digital video segments; and a docking interface to permit the digital camera to be connected to the docking unit. The docking unit includes a connector for receiving the docking interface in the digital camera and for connecting the digital camera to the docking unit; and a recorder for recording onto the separate storage medium. The digital camera, responsive to a user effort, transfers the plurality of digital video segments to the docking unit, and the docking unit records the plurality of digital video segments onto the separate storage medium.

16 Claims, 7 Drawing Sheets

U.S. PATENT DOCUMENTS

| | | | |
|---|---|---|---|
| 6,408,301 B1* | 6/2002 | Patton et al. | 707/102 |
| 6,522,354 B1* | 2/2003 | Kawamura et al. | 348/333.05 |
| 6,944,700 B2* | 9/2005 | Bateman et al. | 348/375 |
| 7,068,307 B2* | 6/2006 | Hyodo | 348/231.2 |
| 7,119,835 B2* | 10/2006 | Gennetten et al. | 348/207.2 |
| 7,126,629 B1* | 10/2006 | Braunstein et al. | 348/207.1 |
| 7,167,206 B2* | 1/2007 | Kayanuma | 348/375 |
| 7,170,557 B2* | 1/2007 | Manico et al. | 348/373 |
| 2001/0016108 A1* | 8/2001 | Itoh et al. | 386/46 |
| 2002/0149695 A1* | 10/2002 | Kayanuma | 348/375 |
| 2003/0052986 A1* | 3/2003 | Matsumoto | 348/333.05 |
| 2003/0160890 A1* | 8/2003 | Caspe et al. | 348/372 |
| 2003/0210333 A1* | 11/2003 | Manico et al. | 348/220.1 |
| 2004/0021669 A1* | 2/2004 | Fredlund et al. | 345/530 |
| 2004/0257464 A1* | 12/2004 | Pandit et al. | 348/372 |
| 2005/0206751 A1* | 9/2005 | Manico et al. | 348/239 |
| 2005/0287852 A1* | 12/2005 | Sugawara et al. | 439/135 |

FOREIGN PATENT DOCUMENTS

| | | |
|---|---|---|
| WO | 0213522 | 2/2002 |

OTHER PUBLICATIONS

Digital Still Camera Image File Format (EXIF) Version 2.1, Jul. 1998 by the Japan Electronics Industries Development Association (JEIDA), Tokyo, Japan.

Design Rule for Camera File System V 1.0 Dec. 1998, Japan electronics & Industries development Association (JEIDA) Tokyo, Japan.

U.S. Appl. No. 09/549,356, filed Apr. 14, 2002 and entitled Customizing A Digital Camera.

U.S. Appl. No. 09/004,046, filed Jan. 7, 1998 by Ward, etal and entitled Network Configuration File for automatically transmitting Images from an Electronic Still Camera.

U.S. Appl. No. 08/977,382, filed Oct. 18, 2002 by Parulski, et al and entitled: Electronic Camera with Utilization Selection Capability.

U.S. Appl. No. 10/017,809, filed Nov. 30, 2001 by Belz et al and entitled System Including a Digital Camera and Docking Unit for Coupling to the Internet.

* cited by examiner

SYSTEM FOR CAPTURING AND ARCHIVING MOTION VIDEO SEGMENTS

CROSS REFERENCE TO RELATED APPLICATION

This is a 111A application of Provisional Application Ser. No. 60/367,561, filed Mar. 26, 2002.

Reference is made to commonly assigned application U.S. Ser. No. 60/367,586, entitled "MODULAR DIGITAL IMAGING SYSTEM", and provisionally filed on Mar. 26, 2002 in the name of Manico et al, and which is assigned to the assignee of this application.

FIELD OF THE INVENTION

The present invention relates to digital camcorder for recording motion images, and, more particularly, to a system that uses a digital camcorder, docking unit, and secondary storage device to automatically transfer and archive video segments captured using the digital camcorder.

BACKGROUND OF THE INVENTION

Current digital cameras can connect to a host computer by means of a docking unit in order to transfer images to the host computer (e.g., PC). These files can include still image files (e.g. JPEG files) as well as motion video files (e.g. QuickTime files). One example is the Kodak EasyShare DX3600 digital camera, which is sold with an optional docking unit. The camera captures digital still images and motion video segments and stores the images using Flash EPROM memory. The still images and motion video files can be downloaded from the camera to the host computer using the docking unit. If the user configures the EasyShare software on the host computer to provide auto transfers, then, when the user presses the button on the EasyShare docking unit, the still and motion video files are transferred from the camera to a folder on the host computer's hard drive and are erased from the Flash EPROM memory in the digital camera.

A problem with the prior art is, that while transferring images from the camera to the computer's hard drive (via the docking unit) occurs automatically, the motion video files are not easily viewable on the user's home television. Furthermore, the motion video files take up considerable space on the user's computer hard drive and can be lost if the hard drive crashes.

Accordingly, there exists a need for an easy-to-use system for capturing and archiving motion video segments.

SUMMARY OF THE INVENTION

An object of the present invention is to permit the user of a digital camera to easily capture and archive motion video segments. This object is achieved by a system including a digital camera and a docking unit.

The present invention provides a digital motion video camera and a docking unit which enables a user to select actions/operations/functions, such as automatically transferring image files to a video DVD disc, which are automatically initiated each time the camera is placed in the docking unit.

The present invention further provides a digital motion video camcorder that provides time lapse, motion trigger, and slow motion capabilities.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a system for automatically transferring a plurality of digital video segments stored by a digital camera onto a separate storage medium. The system includes the digital camera and a docking unit. The digital camera includes a lens for providing an optical image; an image sensor for receiving the optical image provided by the lens to produce an image signal; a processor responsive to the image signal for producing the plurality of digital video segments; a digital memory for storing the plurality of digital video segments; a color image display for reviewing the digital video segments; and a docking interface to permit the digital camera to be connected to the docking unit. The docking unit includes a connector for receiving the docking interface in the digital camera and for connecting the digital camera to the docking unit; and a recorder for recording onto the separate storage medium. The digital camera, responsive to a user effort, transfers the plurality of digital video segments to the docking unit, and the docking unit records the plurality of digital video segments onto the separate storage medium.

According to another aspect of the invention, there is provided a method of capturing, transferring, and recording digital images. The method includes the step of providing a digital camera wherein the digital camera comprises a lens for providing an optical image; an image sensor for receiving the optical image provided by the lens; a processor; a digital memory; a docking interface to permit the digital camera to be connected to the docking unit. The method further includes the step of providing a docking unit wherein the docking unit comprises a connector for receiving the docking interface in the digital camera and for connecting the digital camera to the docking unit; and a recorder for recording onto the separate storage medium. The method further includes the steps of using the image sensor to receive the optical image and produce an image signal; using the processor to produce a plurality of digital video segments responsive to the image signal; storing the plurality of digital video segments in the digital memory; automatically transferring the plurality of digital video segments to the docking unit responsive to a user effort; and recording the plurality of digital video segments onto the separate storage medium using the docking unit.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Figure 1A:
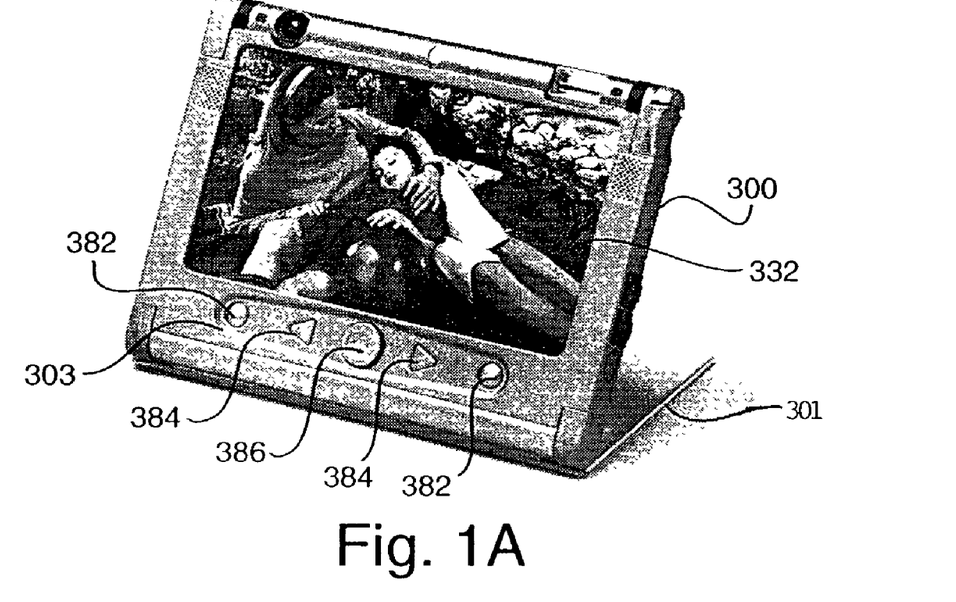
FIG. 1A is an external view of a digital camera in accordance with the present invention.
Figure 1B:
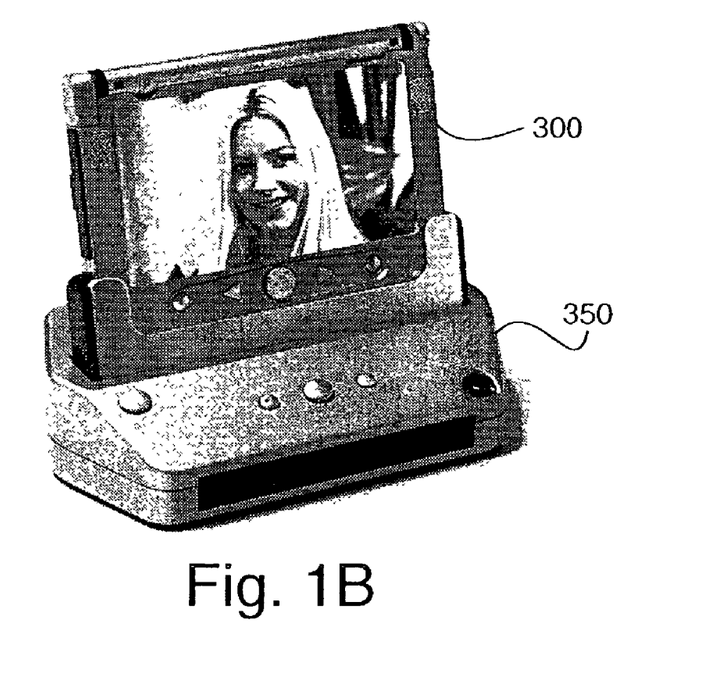
FIG. 1B is an external view of the digital camera and docking unit.

Referring to FIGS. 1A and 1B, in a preferred embodiment of the present invention, a digital camera 300 is adapted to capture motion video images and still images and includes a viewable image display 332, such as a color LCD, an Organic Light Emitting Display (OLED), or the like. Digital camera 300 preferably has a generally substantially flat shape. Digital camera 300 preferably further includes a dual hinge assembly that allows a screen cover 301 to open and close, like a book, and support the camera/screen in an upright position for image capture and display. The primary cover hinge moves freely but is dampened, the secondary hinge has a locking mechanism that is engaged and disengaged in the full open and full closed positions. The inside surface of the cover preferably includes a non-slip rubber coating to assist in protecting the screen from shock and provides a more secure, non-slip support when used as a stand.

Digital camera 300 records images on a solid-state Flash EPROM memory card. This enables the camera to be small in size and low in power consumption. The camera operates as a normal still/video digital camera to capture normal still and video image files. The camera also includes several special modes, which are possible because solid-state memory is used for image storage. These modes include a time-lapse mode, where instead of capturing 30 images per second, the images are captured at a much slower rate (e.g., 1 image per second) for example to show a sunrise or flower blossom opening. The images can then be played back at a faster rate, such as 30 images per second. The modes can also include a "slow motion" mode where the images are captured at a higher than normal rate (e.g., 120 images per second) and played back at a slower rate. These modes can be triggered by a significant change in the scene, such as by rapid motion, turning on the lights, etc. When used in the trigger mode, the camera is turned on to capture images at a regular rate (e.g. an image every second) but the images are not recorded until there is a significant change between two captured images, such as due to motion (e.g., a subject entering the room with the camera).

Digital camera 300 further includes user controls 303, up/down arrows 382, left/right arrows 384, and selection button 386, as will be more particularly described below.

The camera connects/mates to a docking unit 350, such as shown in FIG. 1B. Docking unit 350 can recharge the camera batteries and enable the motion and still image files to be transferred from the camera to a separate archival storage medium, which is preferably a DVD disc.

Figure 2A:
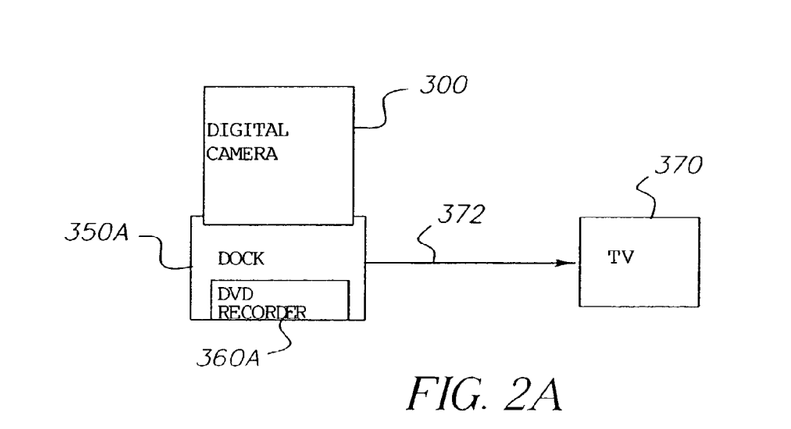
FIG. 2A and FIG. 2B depict block diagrams of two systems suitable for implementing the present invention.

As shown in FIG. 2A, a DVD recorder 360A can be part of docking unit 350A. Alternatively, a DVD recorder can be a peripheral, which attaches to the docking unit. The camera is inserted into the docking unit with the lens facing away from the user and the viewable display facing towards the user, such as shown in FIG. 1B. The combination of the camera, docking unit, and DVD recorder forms a system that automatically transfers video image files from the camera to the DVD disc, so that the DVD disc can be removed from DVD recorder 360A and played back on a standard DVD player.

Docking unit 350A is typically located in an all-purpose room (such as the family room) near the TV entertainment system, rather than next to a computer in an office or den and can optionally connect to a TV monitor or a receiver 370 by means of a suitable video interface 372, which may be for example an analog RF video interface or a component digital video interface.

Docking unit 350A, of FIG. 2A, can also be connected to the Internet in order to transfer and receive still and motion video files, as well as other information, as described in commonly assigned U.S. patent application Ser. No. 10/017, 809 "SYSTEM INCLUDING A DIGITAL CAMERA AND A DOCKING UNIT FOR COUPLING TO THE INTERNET", by Belz et. al., the disclosure of which is incorporated herein by reference.

Figure 2B:
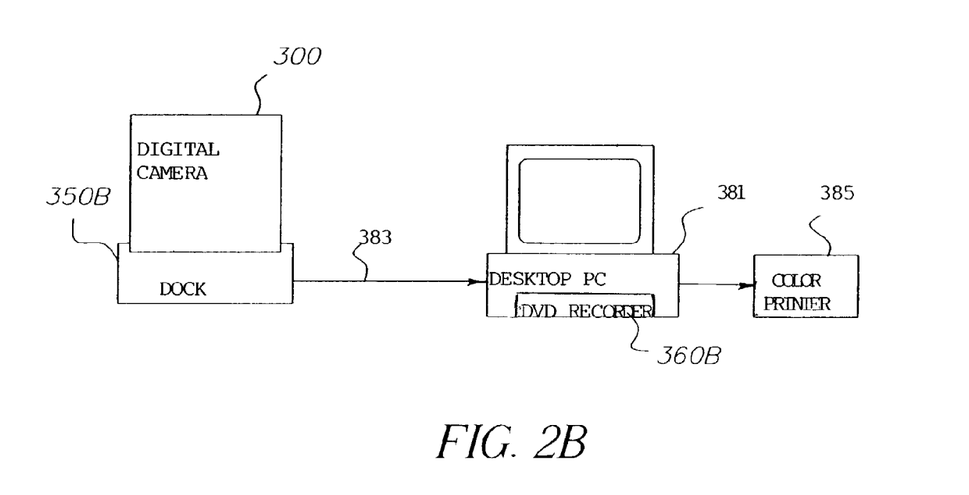

As shown in FIG. 2B, a docking unit 350B can alternatively be designed to attach to a home computer 381 by means of a suitable digital interface 383, which may be for example the well-known USB cable interface or the well-known 802.11 wireless interface. A DVD recorder 360B can be part of desktop computer 381. Desktop computer 381 can optionally be connected to other peripherals, such as a color printer 385.

When digital camera 300 is connected to docking unit 350A or 350B, the system performs actions that have been previously selected by the user. The docking unit can include a button to initiate these actions/operations/functions, or the actions/operations/functions can be initiated as soon as the camera is inserted into the docking unit.

Figure 3:
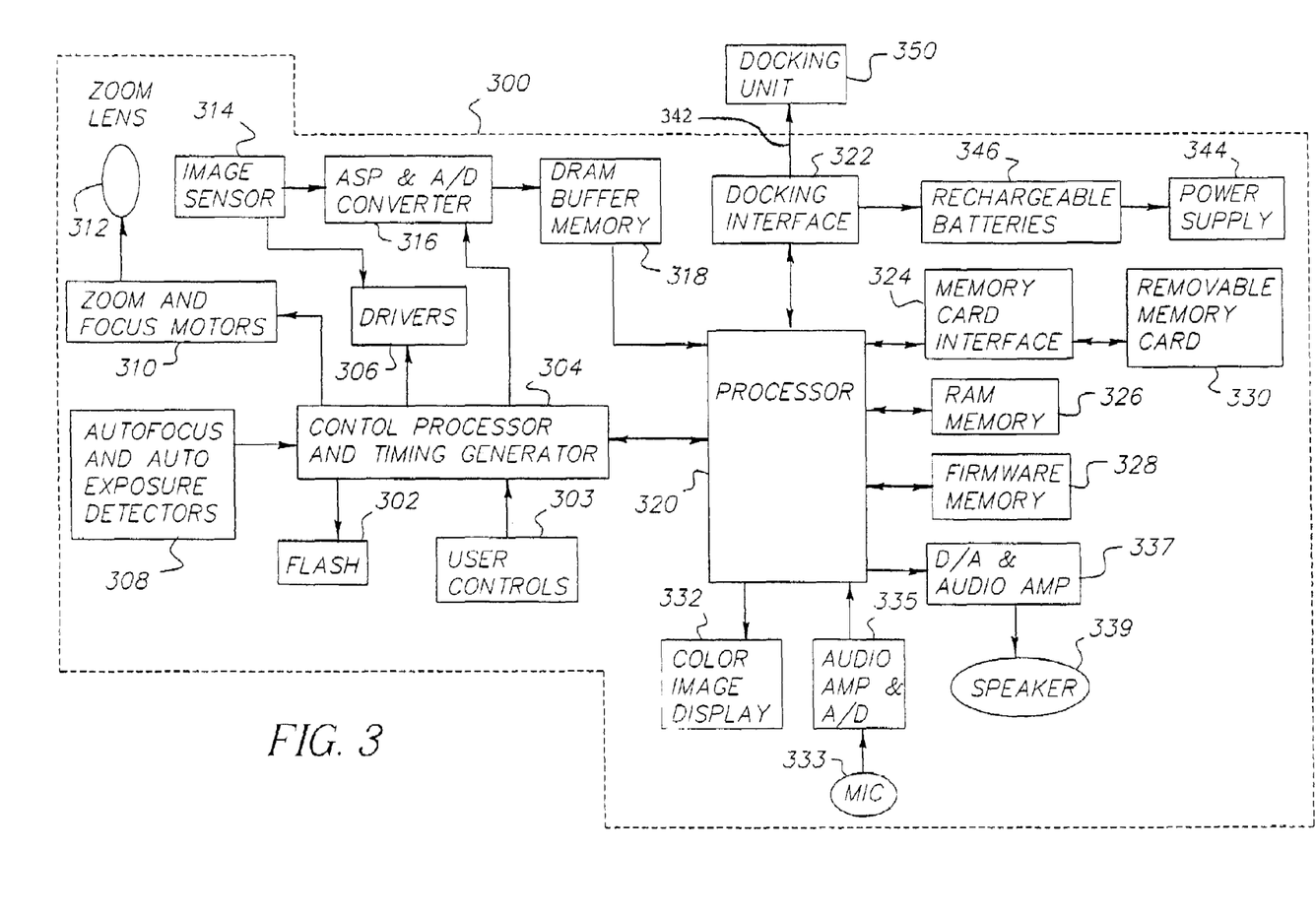
FIG. 3 is a block diagram of the digital camera suitable for the digital camera of FIG. 1A and FIG. 1B.

FIG. 3 is a block diagram showing features of digital camera 300 in more detail. Electrical power for all of the circuits of digital camera 300 is provided by rechargeable batteries 346 by means of a power supply 344. Rechargeable batteries 346 are recharged by means of power supplied by docking unit 350A, 350B to a docking interface 322. Digital camera 300 produces digital still images and digital motion video images that are stored on a removable memory card 330. Digital camera 300 further includes a zoom lens 312 having zoom and focus motor drives 310 and an adjustable aperture and shutter (not shown). Zoom lens 312 focuses light from a scene (not shown) to provide an optical image focused on an image sensor 314, for example, a single-chip color CMOS or CCD image sensor, using the well-known Bayer color filter pattern. In a preferred arrangement, image sensor 314 employs "square" pixels in an array of 1800 horizontal pixels by 1200 vertical pixels, thus providing a 3:2 image aspect ratio. Image sensor 314 is controlled by clock drivers 306. Zoom and focus motors 310 and clock drivers 306 are controlled by control signals supplied by a control processor and timing generator circuit 304.

Control processor and timing generator 304 receives inputs from autofocus and auto exposure detectors 308 and controls a flash 302. The analog image signal from image sensor 314 is amplified and converted to digital data by an analog signal processing (ASP) and analog-to-digital (A/D) converter circuit 316. The digital image data from A/D converter circuit 316 is temporarily stored in a DRAM buffer memory 318 and subsequently processed by a processor 320 controlled by the firmware stored in a firmware memory 328, which can be flash EPROM memory. It is understood that if image sensor 314 is a CMOS sensor, the integrated circuit containing image sensor 314 can also include other circuitry, such as control processor and timing generator 304, clock drivers 306, and ASP and A/D 316 converter circuit.

The processed digital motion and still images are provided to a memory card interface 324, which stores the digital images in files on removable memory card 330. Removable memory cards 330 are known to those skilled in the art. For example, removable memory card 330 can conform to the Compact Flash interface standard, such as described in the *CompactFlash Specification Version* 1.3, published by the CompactFlash Association, Palo Alto, Calif., Aug. 5, 1998. Other types of removable memory cards, including Smart Media cards, PC cards, SD cards, or Memory Stick cards could alternatively be used.

It is understood that the still images can be captured using a high resolution (e.g., 1800×1200 pixels), and digital motion images can be captured using a lower resolution (e.g., 640×480 pixels) with a different aspect ratio. Using a CMOS sensor with programmable readout allows the high resolution sensor to provide an extended digital zoom capability when capturing the lower resolution motion images. In addition, the programmable readout can also be used to adjust the portion of image sensor 314 which is read out during each digital motion image frame to compensate for any camera shake/motion/unsteadiness which might occur during image capture.

Processor 320 provides color interpolation followed by color and tone correction, in order to produce rendered still and motion video image data. The rendered motion image data is then compressed and stored as a motion video image file on removable memory card 330. Processor 320 also creates a smaller size digital still "thumbnail" image of at least one video image frame, for example the first or last frame of the sequence. These thumbnail images can be created as described in commonly assigned U.S. Pat. No. 5,164,831 "ELECTRONIC STILL CAMERA PROVIDING MULTI-FORMAT STORAGE OF FULL AND REDUCED RESOLUTION IMAGES" to Kuchta, et. al., the disclosure of which is herein incorporated by reference. This thumbnail image is also stored on removable memory card 330 in association with the corresponding motion video file, as will be described later with reference to FIG. 6.

In playback mode, color image display 332 can display an array of thumbnail images corresponding to the captured still images and motion video segments. The user selects the desired thumbnail image to initiate playback of a particular motion video file. In a preferred embodiment, as the file is played back, the user can select a "make thumbnail" button as a more preferred image from the segment is viewed. A thumbnail image of this more preferred image is then created and stored on removable memory card 330, replacing (or alternatively augmenting) the thumbnail image that was automatically created (e.g., the first frame of the sequence) when the motion video segment was captured.

Color image display 332 provides a viewable display and can employ an LCD display, an OLED display, or other types of display technologies. Digital camera 300 is controlled by user controls 303. As is best shown in FIG. 1A, user controls 303 can include select button 386 (which can be a four-way selection member) which can initiate a picture taking operation, up/down buttons 382, and left/right buttons 384. The graphical user interface displayed on the color LCD image display 332 is controlled by the user interface portion of the firmware stored in firmware memory 328. The camera user interface can also include a microphone 333 which connects to an audio amplifier and A/D converter 335 to provide a digital audio signal to processor 320. The camera user interface can also include a digital-to-analog (D/A) converter and audio amplifier 337, and a miniature speaker 339 which plays back the recorded audio, and also makes audible sounds when a new picture is taken, or when the user changes modes or advances to review the next stored still or motion image file. Digital camera 300 can further include a video output driver and connector (not shown) for directly providing a video output signal to a TV (not shown).

The still images and the thumbnail image stored on removable memory card 330 can use the format referred to as the "Exif" image format defined in "Digital Still Camera Image File Format (Exif)" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user. The motion video images are stored on the removable memory card 330 using the well-known QuickTime format developed by Apple Computer Inc. It is understood that other still and motion image formats can be employed using various known compression technologies such as JPEG, JPEG2000, MPEG-1, MPEG-2, MPEG-4, and the like. It is further understood that the image format, including the compression technology, can be transcoded as the still or motion image files are transferred from digital camera 30 to DVD recorder 360A,360B.

Figure 6:
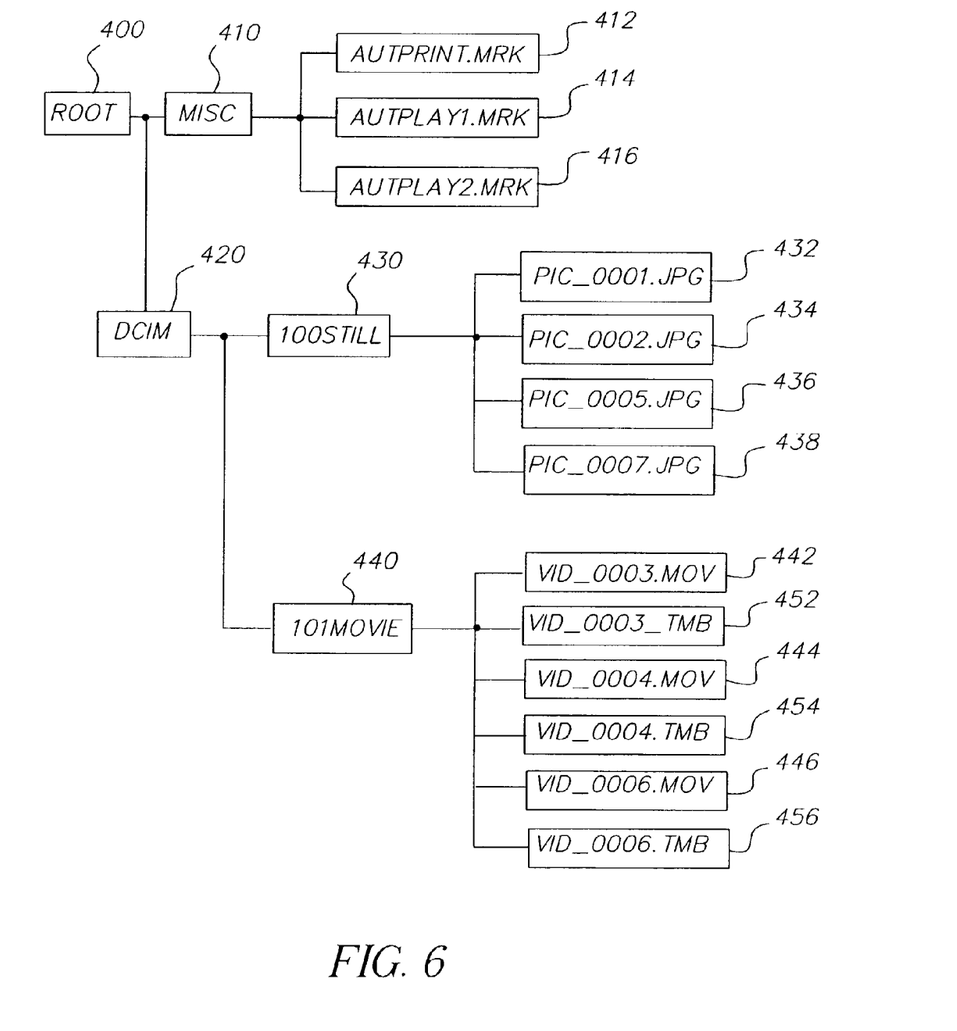
FIG. 6 depicts a directory structure recorded by the digital camera.

The Exif files and Quicktime files are preferably stored on removable memory card 330 using a directory structure conforming to rules referred to as the "DCF" rules defined in "Design Rule For Camera File System" version 1.0, December 1998 by the Japan Electronics Industries Development Association (JEIDA), Tokyo, Japan. An example directory structure recorded on DOS formatted removable memory card 330 by digital camera 300 is depicted in FIG. 6. Two directories are recorded under the root directory 400, MISC directory 410 and DCIM directory 420. The MISC directory 410 contains a file 412 named AUTPRINT.MRK, which is a print order file using the Digital Printer Order Format (DPOF) format. This file can be used to specify images to be printed, as will be described later, including an index image. The MISC directory 410 also includes two DPOF auto play files, AUTPLAY1.MRK file 414 and AUTPLAY.MRK file 416. These files can be used to specify that a number of digital video segments and/or still images should be played in a particular sequence as part of a program. Files 412-416 are examples of control files.

Subdirectory 430 is named 100STILL, to conform to the DCF rules, and contains four JPEG compressed Exif image files, PIC_0001.JPG file 432, PIC_0002.JPG file 434, PIC_0005.JPG file 436, and PIC_0007.JPG file 438. Files 432-438 are still image files that have been captured by the digital camera 300.

Subdirectory 440 is named 101MOVIE, to conform to the DCF rules. It is used to store motion video files and the thumbnail still image associated with each motion video file. The files stored in subdirectory 440 include three Quicktime movie files, file 442 named VID_0003.MOV, file 444 named VID_0004.MOV, and file 446 named VID_0006.MOV. In addition, the files stored in subdirectory 440 include three associated thumbnail image files, file 452 named VID_0003.TMB, file 454 named VID_0004.TMB, and file 456 named VID_0006.MOV. When the motion video files are initially captured, these three thumbnail files 452-456 correspond to the first frame of the motion video segment. As the images are reviewed, however, the user can replace one or more of the associated thumbnail images 452-456 with a preferred image, as was described earlier.

The user uses user controls 303 to set the camera in one of the "capture" modes prior to capturing still or motion images. The user sets the camera in the "review" mode in order to review the captured images (e.g., still image files 432-438 and motion video files 442-446 in FIG. 6). The user can then review the files and delete undesirable still and motion video files using user controls 303.

The user can also use user controls 303 to place the camera in a "place order" mode. In this mode, the user can select still images for printing, and can specify how many copies to make. The camera creates an image utilization file, as described in commonly-assigned U.S. Ser. No. 08/977,382 filed Oct. 18, 2002, entitled, "ELECTRONIC CAMERA WITH UTILIZATION SELECTION CAPABILITY" to Parulski, et al., the disclosure of which is herein incorporated by reference, and as described in commonly-assigned U.S. Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference. This image utilization file 412, named AUTPRINT.MRK, is an ASCII text file containing these instructions, and is known as a Digital Print Order Format (DPOF) file.

The user can also select one or more frames from one or more motion video sequence to be saved and/or printed as a still image. In a preferred embodiment, a selected image frame from the motion video file (e.g., file 446) is automatically converted by digital camera 300 into a JPEG still image file (e.g., file 438), which is stored on removable memory card 330. This JPEG image file is then referenced in the print order file (e.g., AUTPRINT.MRK file 412) to indicate the print size, and the number of print copies, that should be made using this still image.

In a preferred embodiment, the user can also combine a number of motion video files together, so that these files are normally played back, one immediately after the other, when the motion image segments are viewed on image display 332 of digital camera 300 or are transferred onto a DVD disc. Instead of merging the actual motion video files, which could take significant computations, an autoplay file (e.g., AUTPLAY.MRK file 414) is created which provides an ordered list of the motion image files (e.g. VID_0003.MOV file 442 and VID_0004.MOV file 444) that should be grouped into a single playback sequence.

After a series of images have been captured/taken and stored on removable memory card 330, digital camera 300 is connected to docking unit 350A, 350B. Docking interface 322 in digital camera 300 includes an electrical connector that mates with a complimentary connector in the docking unit. Alternatively, removable memory card 330 can be inserted into a memory card reader in a retail kiosk or other printing device, in order to produce prints or to transfer motion video files to an archival media, such as a DVD disc.

Figure 4A:
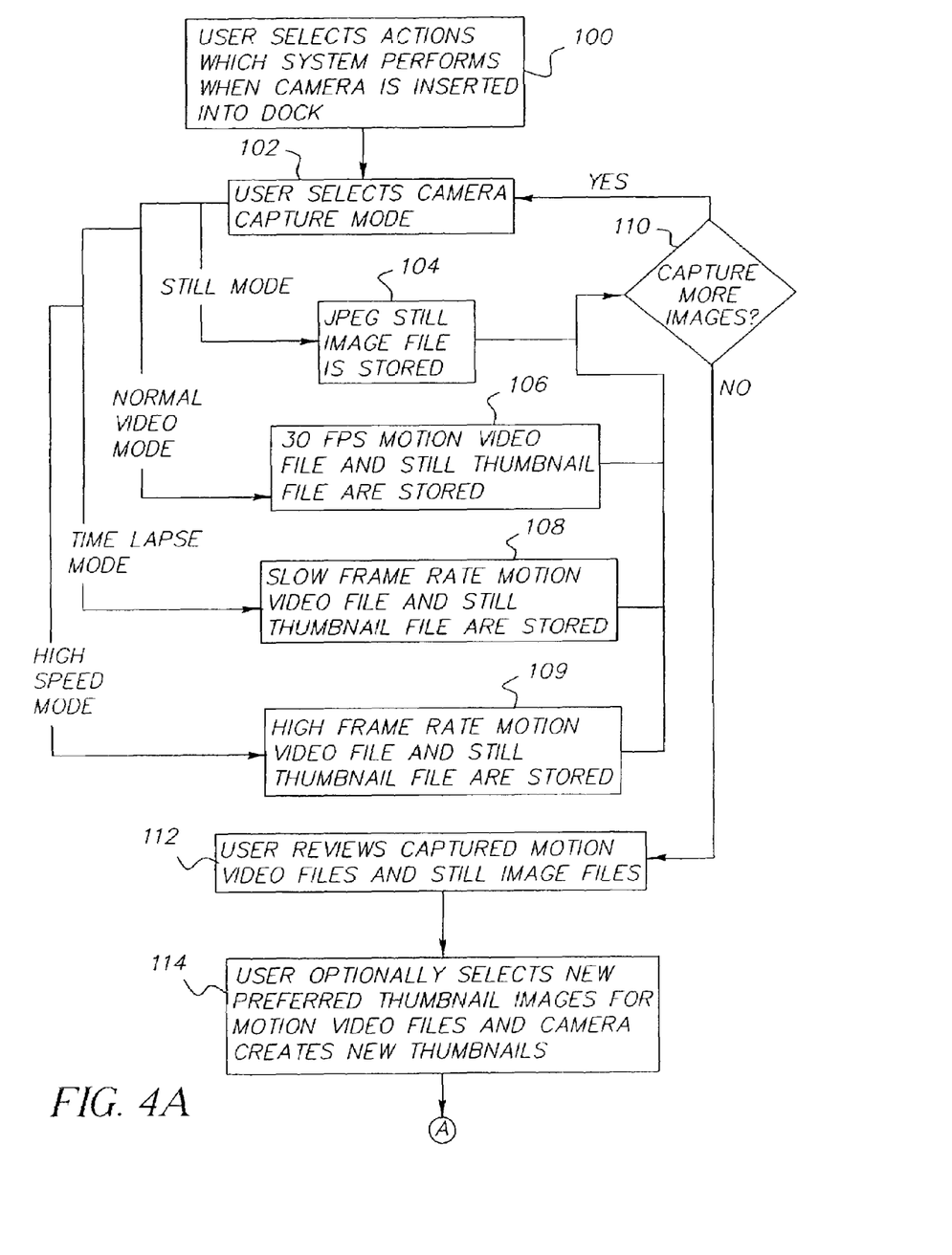
FIG. 4 is a flow diagram showing an embodiment of a method in accordance with the present invention.
Figure 4B:
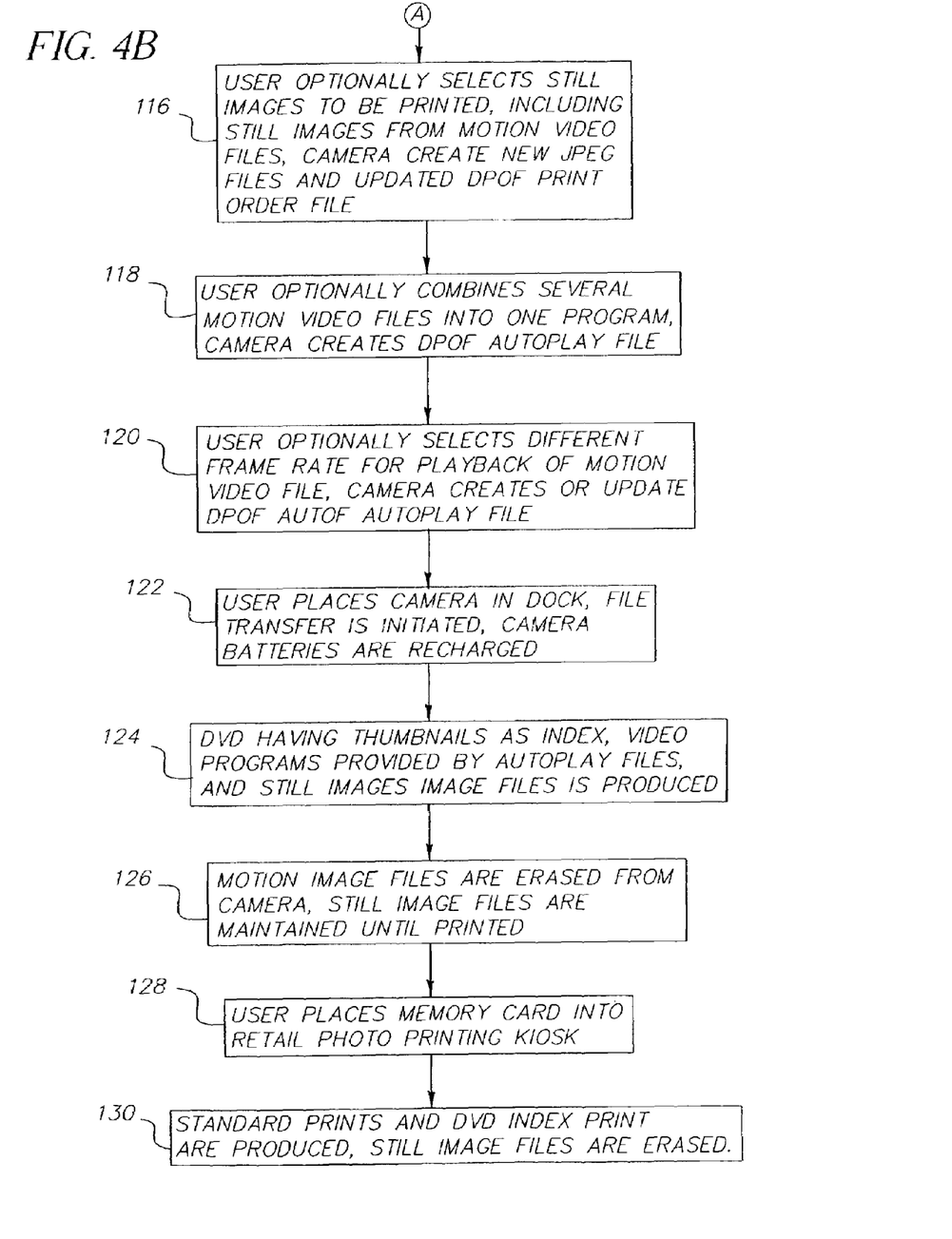

Referring now to FIG. 4, there is shown a flow diagram showing the process of capturing and reviewing still and motion images using digital camera 300, and transferring the images by means of docking unit 350A, 350B in order to automatically perform user-selected actions, such as creating a DVD disc containing motion images and an index frame indicating the video segments transferred to the DVD disc.

At block 100, the user begins by selecting, using the user interface screens of digital camera 300, actions to be performed by digital camera 300 and docking unit 350A, 350B when the digital camera is connected to the docking unit. Alternatively, this selection can be done by the user using their home computer (e.g., computer 380 in FIG. 2B) which transfers the selections to the digital camera 300 via the docking unit 350B, or alternatively at a retail establishment, when the digital camera 300 and docking unit 350 are purchased or leased. In some embodiments, this selection process can include customizing the firmware stored in firmware memory 328, as described in commonly assigned U.S. patent application Ser. No. 09/549,356 filed Apr. 14, 2000, "CUSTOMIZING A DIGITAL CAMERA" to Prabhu et. al, the disclosure of which is incorporated herein by reference.

As one example, the actions selected by the user in block 100 can include automatically creating a DVD disc containing the motion video segments captured by digital camera 300 as well as the still image files and to then delete the motion video files from digital camera 300, while retaining still image files for later printing by a kiosk printer. The selection made in block 100 is retained in firmware memory 328 of digital camera 300, and used whenever digital camera 300 is placed in docking unit 350A, 350B, unless the user decides to select new actions.

In block 102, the user selects a capture mode, which can be a still image capture mode, a normal frame rate motion video capture mode, a time lapse video capture mode, or a high speed video (e.g., slow motion) capture mode. In some embodiments, the user can optionally select whether the recording of motion video images is immediately initiated when the user presses a recording button such as select button 386, or is initiated only after digital camera 300 detects a significant change in the scene, or is initiated at some future time.

In block 104, if the user has selected the still mode, a JPEG still image file is captured and stored each time the capture button (e.g., select button 386) is depressed.

In block 106, if the user has selected the normal frame rate motion video capture mode, a Quicktime movie file is captured using a normal (e.g., 30 frames per second) recording rate, as long as the user enables select button 386. In addition, a thumbnail image file corresponding to the first video frame is stored, as is described in relation to FIG. 6.

In block 108, if the user has selected the time-lapse motion video capture mode, a Quicktime movie file is captured using a very low frame rate (e.g., one frame every second) from the time the user first presses select button 386 until the user again presses select button 386 to stop the recording process. In addition, a thumbnail image file corresponding to the first video frame is stored, as described in relation to FIG. 6. In a preferred embodiment, the recording frame rate is user selectable.

In block 109, if the user has selected the high speed motion video capture mode (e.g., the slow-motion mode), a Quicktime movie file is captured using a relatively high frame rate (e.g., 60 or 120 frames per second) as long as the user enables select button 386. To enable this high readout rate, image sensor 314 can be read in a mode that transfers only some of the pixels, to provide a higher speed, but lower resolution, digital video recording. In addition, a thumbnail image file corresponding to the first video frame is stored, as described in relation to FIG. 6. In a preferred embodiment, the recording frame rate is user selectable.

In block 110, the user decides whether to capture more images, returning to block 102, or to review the captured images in block 112, using color image display 332 in FIG. 3. The user interface displayed on color image display 332 can use the methods described in commonly assigned U.S. Pat. No. 6,147,703 "ELECTRONIC CAMERA WITH IMAGE REVIEW" to Miller, et al., and commonly assigned U.S. Pat. No. 6,233,015 B1 "CAMERA WITH USER COMPLIANT BROWSE AND DISPLAY MODES" to Miller, et al., the disclosures of which are herein incorporated by reference.

Figure 5A:
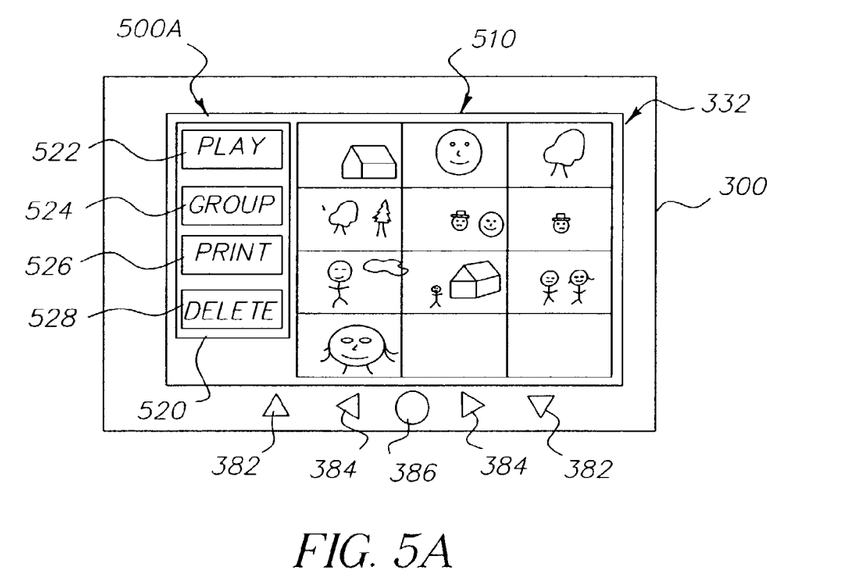
FIG. 5A and FIG. 5B depict user interface screens.

FIG. 5A shows a first user interface screen 500A, which can be displayed on color image display 332 of digital camera 300. First user interface screen 500A includes a thumbnail image display window 510, which displays an array of thumbnail images of the still and motion video files stored on removable memory card 330. First user interface screen 500A also includes a command area 520 having a plurality of command icons for performing operations on selected thumbnail images. These command icons include a play icon 522, a group icon 524, a print icon 526, and a delete icon 528.

Figure 5B:
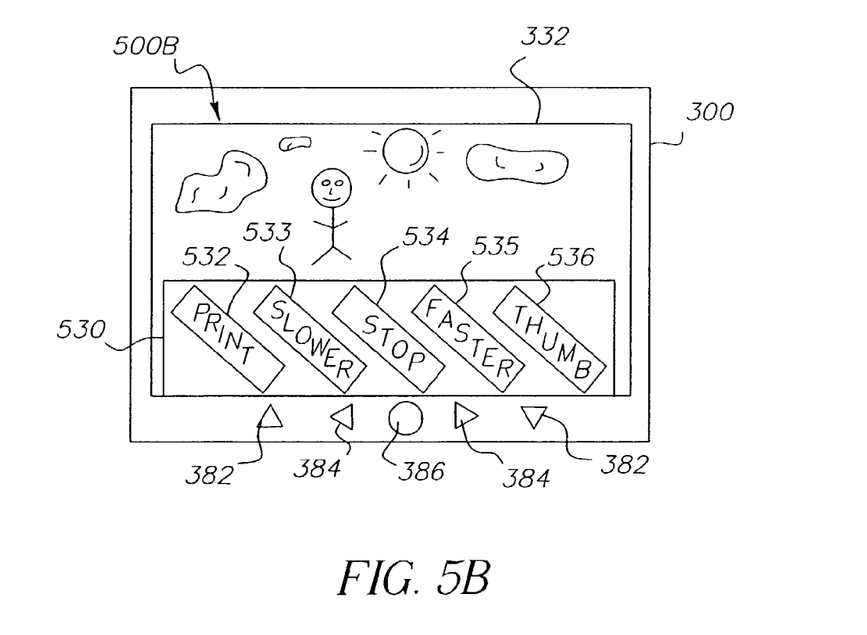

FIG. 5B shows a second user interface screen 500B, which can be displayed on color image display 332 of digital camera 300. Second user interface screen 500B plays a video image and optionally displays at least one function 530 corresponding to user controls 303 (e.g., controls 382, 384, 386). These functions 530 can include a print function 532, a "slower playback" function 533, a "stop" function 534, a "faster playback" function 535, and a "make thumbnail" function 536.

Referring again to FIG. 4, in block 114, the user optionally selects new preferred thumbnail images for one or more motion video files. This is done by first selecting a current thumbnail image from thumbnail image display window 510, and then selecting play command icon 522, in order to play the motion video segment using user interface screen 500B in FIG. 5B. Then, at a preferred point in the motion video segment, the user presses select button 386 to freeze the image, and then presses a button corresponding to the "make thumbnail" function 536. In response, processor 320 in digital camera 300 creates a thumbnail image of this particular (e.g., frozen) image frame, and replaces the current thumbnail file (e.g., file 452 in FIG. 6 associated with Quicktime file 442) with this new thumbnail file.

In block 116, the user optionally selects a still image from the motion segment to be printed. This is done by first selecting a current thumbnail image from thumbnail image display window 510, and then selecting play command icon 522, in order to play this motion video segment using user interface screen 500B in FIG. 5B. Then, at the preferred point in the motion video segment, the user presses select button 386 to freeze the image, and then presses the button corresponding to the "print" function 532. In response, processor 320 in digital camera 300 creates a full size JPEG image file of the particular (e.g., frozen) image frame, stores the JPEG file in removable memory card 330, and adds an appropriate entry to AUTPRINT.MRK print order file 412.

In block 118, the user optionally combines several motion video image segments into a single program. This is accomplished by first selecting a plurality of thumbnail images from thumbnail image display window 510 corresponding to motion video segments, and then selecting group command icon 524. In response, processor 320 in digital camera 300 creates an autoplay file (e.g., AUTPLAY1.MRK file 414) indicating that the selected motion video segments should be treated as a single sequence.

In block 120, the user optionally selects a different frame rate to be used for playback of a motion video file. This is accomplished by first selecting a current thumbnail image from thumbnail image display window 510, and then selecting play command icon 522, in order to play this motion video segment using user interface screen 500B in FIG. 5B. Then, the user presses the button corresponding to "slower" function 533 or "faster" function 535, until the user is satisfied with the playback speed. This feature is particularly useful when the slow frame rate mode (block 108) or the high frame rate mode (block 110) was used to capture the motion video segment. In response, processor 320 in digital camera 300 creates an autoplay file (e.g., AUTPLAY2.MRK file 416) indicating that the selected motion video segment should be played back at the user selected frame rate.

In block 122, the user places digital camera 300 in docking unit 350A, 350B. The docking unit recharges rechargeable batteries 346 in digital camera 300. In addition, the user selected actions from block 100 are automatically performed in response to a "user effort" such as placing digital camera 300 in docking unit 350A, 350B, or pressing a button on the docking unit after connecting digital camera 300.

In block 124, a DVD disc is created by DVD recorder 360A in FIG. 2A or by DVD recorder 360B in FIG. 2B. This DVD disc includes an index at the beginning of the disc, as is common with DVDs. In the present invention, the DVD index includes thumbnail images corresponding to the associated thumbnail files (e.g., files 452-456 in FIG. 6). These thumbnail files can be the thumbnails automatically recorded in blocks 106-109, or the preferred thumbnails selected by the user in block 114. If the user combined several motion video files into one program in block 119, these files are combined into one DVD index entry which plays all of the segments in consecutive order. If the user captured still images, these JPEG image files are also recorded onto the DVD as high resolution still image files, which can be accessed by a computer.

In block 126, the motion image files (e.g., files 442-446) are erased from removable memory card 330 in accordance with the example actions selected by the user in block 100. The JPEG still image files (e.g., files 432-438), including a JPEG file created from the motion video file (e.g., JPEG file 438) are retained however, since the print order indicated by the AUTPRINT.MRK file 412 has not yet been produced.

In block 128, the user removes removable memory card 330 from digital camera 300, and takes removable memory card 330 to a retail photo printing kiosk (not shown), such as a Kodak PictureMaker kiosk manufactured by Eastman Kodak Company.

In block 130, the kiosk accesses the print order indicated by the AUTPRINT.MRK file 412, and produces the prints selected by the user in block 116. These can include an index print corresponding to the thumbnail files used in the DVD index. This index print can be sized to fit into the sleeve of the DVD case, thus providing an index having a thumbnail image associated with each motion video segment. As described earlier, the thumbnail images are automatically generated by digital camera 300, and may be replaced by a user preferred thumbnail image in block 114. The still image files are then erased from removable memory card 330.

The customer can, of course, repeat blocks 102 to 124 to capture and transfer more still and motion video images, with the digital camera 300 and the docking unit 350 performing the actions selected by the user in block 100.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims and all changes that come within the meaning and range of equivalents thereof are intended to be embraced therein.

| PARTS LIST | |
|---|---|
| 100 | block |
| 102 | block |
| 104 | block |
| 106 | block |
| 108 | block |
| 109 | block |
| 110 | block |
| 112 | block |
| 114 | block |
| 116 | block |
| 118 | block |
| 120 | block |
| 122 | block |
| 124 | block |
| 126 | bloc |
| 130 | block |
| 300 | digital camera |
| 301 | screen cover |
| 302 | flash |
| 303 | user controls |
| 304 | control processor and timing generator circuit |
| 306 | clock driver |
| 308 | autofocus and autoexposure detectors |
| 310 | zoom and focus motor drives |
| 312 | zoom lens |
| 314 | image sensor |
| 316 | analog signal processing and analog-to-digital converter circuit |
| 318 | DRAM buffer memory |
| 320 | processor |
| 322 | docking interface |
| 324 | memory card interface |
| 328 | firmware memory |
| 330 | removable memory card |
| 332 | image display |
| 333 | microphone |
| 335 | A/D converter |
| 337 | D/A and audio amplifier |
| 339 | miniature speaker |
| 344 | power supply |
| 346 | rechargeable batteries |
| 350A | docking unit |
| 350B | docking unit |
| 360A | DVD recorder |
| 360B | DVD recorder |
| 370 | receiver |
| 372 | video interface |
| 381 | home computer |
| 382 | up/down arrows |
| 383 | digital interface |
| 384 | left/right arrows |
| 385 | color printer |
| 386 | select button |
| 400 | root directory |
| 410 | MISC directory |
| 412-416 | control files |
| 420 | DCIM directory |

-continued

| PARTS LIST | |
|---|---|
| 430 | subdirectory |
| 432-438 | still image files |
| 440 | subdirectory |
| 442-446 | motion video/movie files |
| 452-456 | thumbnail image files |
| 500A | user interface screen |
| 500B | user interface screen |
| 510 | thumbnail image display |
| 520 | command area |
| 522 | play icon |
| 524 | group icon |
| 526 | print icon |
| 528 | delete icon |
| 530 | function |
| 532 | print function |
| 533 | slower playback function |
| 534 | stop function |
| 535 | faster playback function |
| 536 | make thumbnail function |

What is claimed is:

1. A system including a digital camera and a docking unit to automatically transfer a plurality of digital video segments stored by the digital camera onto a separate storage medium, comprising:
   a) the digital camera including:
      i) a lens for providing an optical image;
      ii) an image sensor for receiving the optical image provided by the lens to produce an image signal;
      iii) a processor responsive to the image signal for producing the plurality of digital video segments;
      iv) a digital memory for storing the plurality of digital video segments;
      v) a color image display for reviewing the digital video segments;
      vi) a docking interface to permit the digital camera to be connected to the docking unit; and
   b) the docking unit including:
      i) a connector for receiving the docking interface in the digital camera and for connecting the digital camera to the docking unit; and
      ii) a recorder for recording onto the separate storage medium;
   wherein the digital camera, responsive to a user effort, transfers the plurality of digital video segments to the docking unit, and the docking unit records the plurality of digital video segments onto the separate storage medium, wherein the processor of the digital camera further produces still image files, stores the still image files in the digital memory, and transfers the still image files to the docking unit, and wherein the digital camera automatically deletes the plurality of digital video segments from the digital memory after the docking unit records the plurality of digital video segments onto the separate storage medium, while not automatically deleting the still image files.

2. The system of claim 1, wherein the docking unit further includes a button, and wherein the user effort comprises pressing the button on the docking unit.

3. The system of claim 1, wherein the docking unit further comprises a camera docking area, and wherein the user effort comprises placing the digital camera into the camera docking area.

4. The system of claim 1, wherein the separate storage medium is a DVD disc.

5. The system of claim 1, wherein the digital camera automatically stores a thumbnail image in association with each of the plurality of digital video segments.

6. The system of claim 5, wherein the thumbnail image can be a user preferred thumbnail image.

7. The system of claim 5, wherein the separate storage medium is a DVD disc, and the DVD disc includes an index including the thumbnail images associated with each of the plurality of digital video segments.

8. The system of claim 1, wherein the digital camera automatically deletes the plurality of digital video segments from the digital memory after the docking unit records the plurality of digital video segments onto the separate storage medium.

9. A method of capturing, transferring, and recording digital images, comprising the steps of:
   providing a digital camera comprising:
   i) a lens for providing an optical image;
   ii) an image sensor for receiving the optical image provided by the lens;
   iii) a processor;
   iv) a digital memory;
   v) a docking interface to permit the digital camera to be connected to the docking unit;
   providing a docking unit comprising:
   i) a connector for receiving the docking interface in the digital camera and for connecting the digital camera to the docking unit; and
   ii) a recorder for recording onto the separate storage medium;
   using the image sensor to receive the optical image and produce an image signal;
   using the processor to produce a plurality of digital video segments responsive to the image signal;
   storing the plurality of digital video segments in the digital memory;
   automatically transferring the plurality of digital video segments to the docking unit responsive to a user effort;
   recording the plurality of digital video segments onto the separate storage medium using the docking unit;
   producing still image files, storing the still image files in the digital memory, and transferring the still image files to the docking unit; and
   automatically deleting the plurality of digital video segments from the digital memory after the docking unit records the plurality of digital video segments onto the separate storage medium, while not automatically deleting the still image files.

10. The method of claim 9, wherein the docking unit further includes a button, and wherein the user effort comprises pressing the button on the docking unit.

11. The method of claim 9, wherein the docking unit further includes a camera docking area, and wherein the user effort comprises placing the digital camera into the camera docking area.

12. The method of claim 9, wherein the separate storage medium is a DVD disc.

13. The method of claim 9, further including the step of the digital camera automatically storing a thumbnail image in association with each of the plurality of digital video segments.

14. The method of claim 13, wherein the thumbnail image can be a user preferred thumbnail image.

15. The method of claim 13, wherein the separate storage medium is a DVD disc, and further includes the step of generating an index on the DVD disc including the thumbnail images associated with each of the plurality of digital video segments.

16. The method of claim 9, further including the step of automatically deleting the plurality of digital video segments from the digital memory after the docking unit records the plurality of digital video segments onto the separate storage medium.

\* \* \* \* \*